United States Patent [19]
Fletcher et al.

[11] 3,744,510
[45] July 10, 1973

[54] INJECTOR FOR USE IN HIGH-VOLTAGE ISOLATORS FOR LIQUID FEED LINES

[76] Inventors: James C. Fletcher, Administrator of the National Aeronautics and Space Administration in respect to an invention of; John A. Snyder, Woodland Hills, Calif.

[22] Filed: Oct. 7, 1971

[21] Appl. No.: 187,262

[52] U.S. Cl............... 137/154, 137/604, 137/1
[51] Int. Cl.............................................. F17d 3/00
[58] Field of Search .................. 137/154, 1, 13, 604

[56] References Cited
UNITED STATES PATENTS
3,443,570  5/1969  King.............................. 137/604 X
2,631,759  3/1953  Hoopes........................... 137/13 UX
3,182,674  5/1965  Horton.............................. 137/13

*Primary Examiner*—Alan Cohan
*Attorney*—John R. Manning et al.

[57] ABSTRACT

An improved injector for use in introducing fluid substances into feed lines employed in delivering flowing bodies of liquids. The injector includes a porous plug, concentrically related to a feed line, including an internally tapered surface of a truncated conical configuration having an inlet orifice of a first diameter and a discharge orifice of a second diameter substantially smaller than the first diameter and an external surface circumscribed by an annular chamber containing a body of insulating gas.

1 Claim, 3 Drawing Figures

PATENTED JUL 10 1973 3,744,510

JOHN A. SNYDER
INVENTOR
Wilfred Griffin
ATTORNEYS

INJECTOR FOR USE IN HIGH-VOLTAGE ISOLATORS FOR LIQUID FEED LINES

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The invention relates to fluid injectors for high-voltage isolators employed in feed lines conducting an electrically conductive fluid, and more particularly to a porous plug configured to efficiently develop an isolating bubble in the feed line for electrically isolating selected segments of a flowing body of liquid metal.

2. Description of the Prior Art

The prior art includes injectors for injecting bubbles of selected fluids into feed lines for electrically isolating adjacent segments of a flowing body of an electrically conductive material such as a body of liquid metal and the like. While the injectors currently employed often function satisfactorily for their intended purpose, it is important to appreciate that where gas is injected into a flowing body of electrically conductive fluid for purposes of isolating the body into electrically insulated segments, it is highly desirable to furnish a stable, predictably repetitive flow of the bubbles in order to preclude an inadvertent short-circuiting of adjacent segments of the body.

Accordingly, there currently exists a need for an improved injector for injecting bubbles of gas into liquid feed lines in order to interrupt the electrical continuity of a flowing body of liquid metal.

OBJECTS AND SUMMARY OF THE INVENTION

It therefore is an object of the instant invention to provide an improved injector for use in introducing bubbles of gas into feed lines of a type employed in delivering flowing bodies of electrically conductive liquids.

It is another object to provide a porous plug including an internally tapered surface of a truncated conical configuration for enhancing an injection of nonconductive gas into a body of conductive liquid as the liquid is delivered by a feed line.

It is another object to provide an improved injector including a porous plug configured to be received within a feed line and circumscribed by a pressure chamber of an annular configuration and further including an internal surface of a frusto-conical configuration for enhancing injection of bubbles of gas into the feed line.

These and other objects and advantages are achieved by the use of a porous plug having an internally tapered surface of a truncated conical configuration surrounded by a pressure chamber whereby gases delivered to the chamber are caused to pass through the plug, diffuse upstream to the largest diameter of the conical surface, accumulate in bubbles of an annular configuration, and then progress along the internal surface to the discharge or downstream orifice for interrupting the electrical continuity of the flowing body of fluid.

DESCRIPTION OF THE PREFERRED EMBODIMENT

Figure 1:
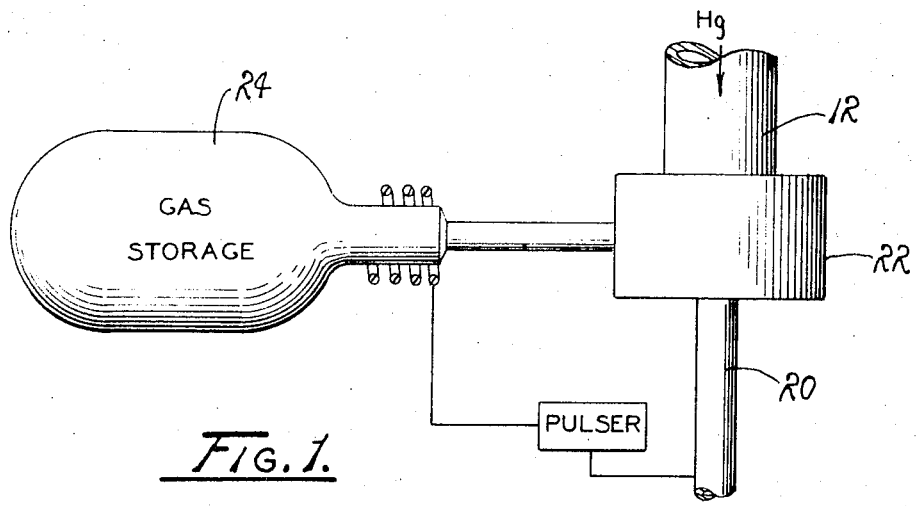
FIG. 1 is a fragmented elevation of a system employing an injector embodying the principles of the instant invention.

Referring now to the drawings wherein like reference characters designate like or corresponding parts throughout the several views, there is shown in FIG. 1 a system employing an injector embodying the principles of the instant invention.

A similar system is disclosed in U.S. Pat. No. 3,443,570 issued May 13, 1969 to Harry J. King, et al.

Figure 2:
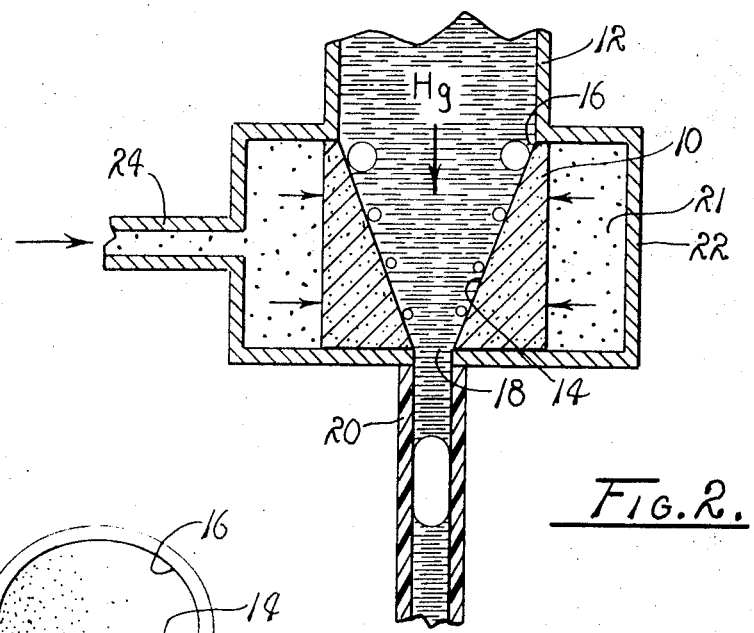
FIG. 2 is a fragmented, sectional view of the system illustrated in FIG. 1.
Figure 3:
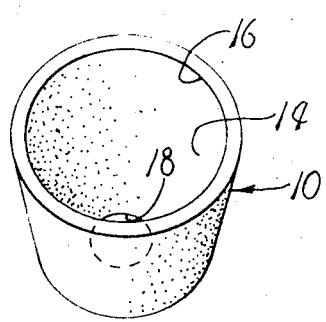
FIG. 3 is a perspective view of a porous plug included within the injector illustrated in FIG. 2.

As best shown in FIG. 2, the injector includes a porous plug 10 coaxially related to an input segment 12 of a feed line which is employed in delivering a flowing body of electrically conductive material, such as a liquid metal including mercury, to the plug 10.

The plug 10 is fabricated from a porous metal, including porous tungsten and iron. The plug is machined to include an internal surface 14 of a frusto-conical configuration having a first or inlet orifice 16 of a given diameter and a second or discharge orifice 18 of a diameter substantially less than the diameter of the orifice 16. To the discharge orifice there is united a fluid discharge segment of the feed line, designated 20, which serves to conduct the liquid metal, or similar material, away from the plug 10.

The plug 10 preferably is seated in an hermetically sealed chamber 21 of an annular configuration defined by the internal surfaces of an enclosure wall 22, and the external cylindrical surface of the porous plug 10. The chamber 21 is supplied with gas delivered under pressure through a pressure line 24 which serves to couple the chamber 21 with a source of gas designated 24, FIG. 1.

Accordingly, it is apparent that the gas delivered through the pressure line 24 is simultaneously applied, at a common pressure, to the external surfaces of the porous plug 10. The gas thus applied penetrates the plug, diffuses upstream to the largest diameter of the internal surface of the plug and collects there for forming a bubble of a substantially toroidal configuration. This, of course, is a known natural phenomenon associated with surface energy forces, which are a function of the radius of the surface.

Once a sufficient quantity of gas is accumulated, the resulting bubble becomes sufficiently large to progress toward the discharge orifice 18 whereupon it looses its toroidal configuration, changes to a configuration of lower surface energy and passes through the discharge orifice 18. The bubble emerges from the orifice 18 as an elongated rod-shape bubble which serves to segment the body of fluid flowing through the orifice 18 into adjacent segments within the discharge segment 20 of the feed line.

In view of the foregoing, it should readily be apparent that the instant invention is embodied in an improved injector which provides a practical solution to the problem of establishing a stable, predictably repetitive flow of bubbles of nonconductive gas for electrically isolating into adjacent segments a flowing body of electrically conductive fluid.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An improved injector for use in accurately developing a series of electrically isolating bubbles within feed lines employed in delivering flowing bodies of electrically conductive liquids comprising:

A. a metallic plug, pervious to selected electrically insulating substances in a gaseous state and impervious to selected electrically conductive substances in a liquid state, said plug being adapted to be coupled within a feed line for conducting a flowing body of said liquid and having an internal surface of a frusto-conical configuration extending between a discharge orifice of a first diameter and an inlet orifice of a second diameter substantially greater than said first diameter;

B. an hermetically sealed chamber circumscribing the plug between said orifices; and C. means for coupling said chamber with a pressurized source of said electrically insulating substance.

* * * * *